Figure 1:
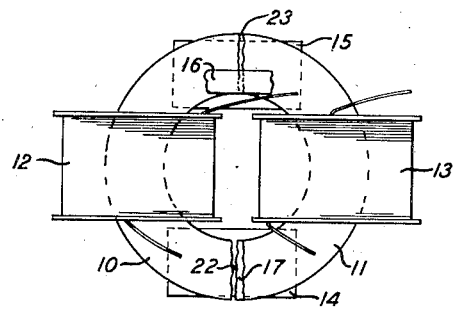
Figure 2:
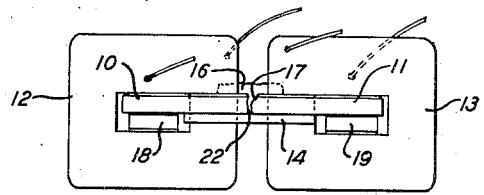
Figure 3:
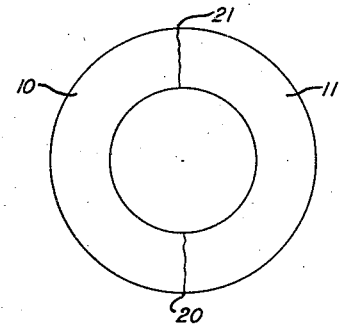
Figure 4:

Nov. 29, 1932.   H. SCHWARTZMANN   1,889,421

ELECTRICAL COIL AND METHOD OF MANUFACTURING IT

Filed March 5, 1932

INVENTOR
H. SCHWARTZMANN
BY
E.R. Nowlan
ATTORNEY a magnetic material over said air gap on the opposite side of the core from said non-magnetic material, with a cementing material between said core and said magnetic material, until predetermined electrical properties are obtained.

3. The method of manufacturing electrical coils comprising placing a winding on a divided core, positioning a non-magnetic solid material on one side of said core, with a cementing material between the core and said non-magnetic material, over the ends of the core which provide an air gap between the core sections, causing said cementing material to harden, and adjusting the air gap by removing a small amount of core material from the core on one side of said gap until predetermined electrical properties are obtained.

4. The method of manufacturing electrical coils comprising placing a winding on a divided core, positioning a non-magnetic solid material on one side of said core and over the ends of the core which provide an air gap between the core sections, adjusting the air gap, with a cementing material between the core and said non-magnetic material, until predetermined electrical properties are obtained, causing said cementing material to harden, and adjusting the position of a magnetic material over said air gap on the opposite side of the core from said non-magnetic material, with a cementing material between said core and said magnetic material, until predetermined electrical properties are obtained.

5. The method of manufacturing electrical coils comprising placing a winding on a divided core, positioning a non-magnetic solid material on one side of said core and over the ends of the core which provide an air gap between the core sections, adjusting the air gap, with a cementing material between the core and said non-magnetic material, until predetermined electrical properties are obtained, causing said cementing material to harden, and removing a small amount of core material from one side of the air gap on the opposite side of the core from that to which said non-magnetic material is secured until predetermined electrical characteristics are obtained.

6. The method of manufacturing electrical coils which consists in forming a core, dividing the core into a plurality of substantially identical sections, placing windings thereon in sections, assembling the core sections in spaced relation with a non-magnetic solid material on one side of said core and a cementing material between said core and said non-magnetic material, varying the space between the core sections until a definite predetermined effect is obtained in the coil, and allowing the cementing material to solidify and unite the core sections with the non-magnetic solid material.

7. The method of manufacturing electrical coils which consists in forming a core, dividing the core into a plurality of substantially identical sections, placing windings thereon in sections, assembling the core sections in spaced relation with a non-magnetic solid material on one side of said core and a cementing material between said core and said non-magnetic material, varying the space between the core sections until a definite predetermined effect is obtained in the coil, allowing the cementing material to solidify and unite the core sections with the non-magnetic solid material, and adjusting the position of a strip of magnetic material over said air gap on the opposite side of the core from said non-magnetic material, with cementing material between said magnetic material and said core, until a definite predetermined effect is obtained in the coil.

8. The method of manufacturing electrical coils which consists in forming a core, dividing the core into a plurality of substantially identical sections, placing windings thereon in sections, assembling the core sections in spaced relation with a non-magnetic solid material on one side of said core and a cementing material between said core and said non-magnetic material, varying the space between the core sections until a definite predetermined effect is obtained in the coil, allowing the cementing material to solidify and unite the core sections with the non-magnetic solid material, and removing a small amount of core material from one side of said air gap on the opposite side of the core from said non-magnetic material until a definite predetermined effect is obtained in the coil.

9. The method of manufacturing electrical coils which consists in forming a core, dividing the core into a plurality of substantially identical sections, placing windings thereon in sections, assembling the core sections in spaced relation with a non-magnetic solid material on one side of said core and a cementing material between said core and said non-magnetic material, varying the space between the core sections until a definite predetermined effect is obtained in the coil, allowing the cementing material to solidify and unite the core sections with the non-magnetic solid material, adjusting the position of a magnetic material over said air gap on the opposite side of the core from said non-magnetic material, with a cementing material between said magnetic material and said core, until a definite predetermined effect is obtained in the coil, and removing a small amount of core material from one side of another of said air gaps until predetermined electrical characteristics are obtained.

10. In an electrical coil having a core, windings thereon in sections assembled over said core, said core having a plurality of substantially identical sections held in spaced relation with a non-magnetic solid material on one side of said core and a cementing material between said core and said non-magnetic material to permit varying the space between the core sections until a definite predetermined effect is obtained in the coil and upon solidification uniting the core sections and the non-magnetic solid material.

11. In an electrical coil having a winding on a divided core, a non-magnetic solid material on one side of said core and over the ends of the core sections with a cementing material between the core and said non-magnetic material for permitting adjustment of the air gap between the core sections, and a strip of a magnetic material over said air gap on the opposite side of the core from said non-magnetic material with a cementing material between said core and said magnetic material to permit adjustment of the position of said strip of magnetic material until predetermined electrical properties are obtained and upon solidification uniting the core sections and the strip of magnetic material.

12. The method of manufacturing an electrical coil comprising breaking an annular magnetic core, mounting a plurality of divided windings on the core, joining the parts of the core so as to form an air gap therebetween, securing the windings to the core and removing a portion of said magnetic material at a predetermined point with respect to said windings and said air gap until predetermined electrical properties are obtained.

13. A magnetic coil comprising a broken annular core, a pair of windings mounted one upon each section of the core, means for securing the parts of the core with a suitable air gap therebetween, and means comprising a piece of magnetic material secured to said core over said air gap for obtaining predetermined electrical characteristics.

14. A magnetic coil comprising a broken annular core, a winding on said core, means for securing the parts of the core with a suitable air gap therebetween, and means comprising a piece of magnetic material secured adjacent said air gap for obtaining predetermined electrical characteristics.

In witness whereof, I hereunto subscribe my name this 23rd day of February, 1932.

HARRY SCHWARTZMANN.

Nov. 29, 1932.    E. N. LIGHTFOOT    1,889,445
ELECTRICAL RESISTANCE DEVICE
Filed Feb. 19, 1930    2 Sheets-Sheet 1
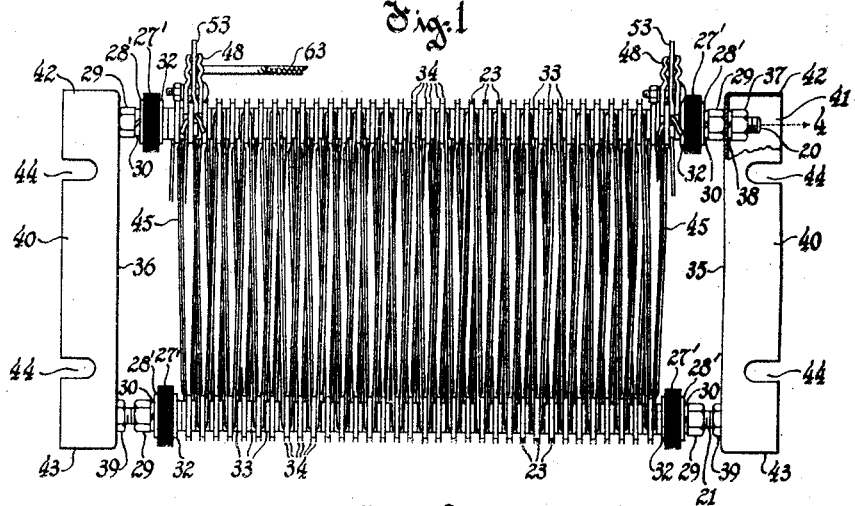
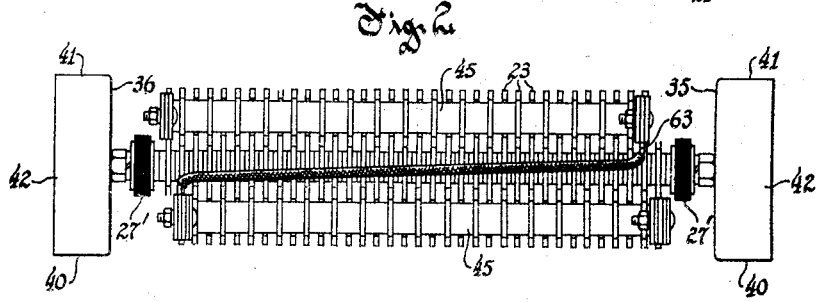
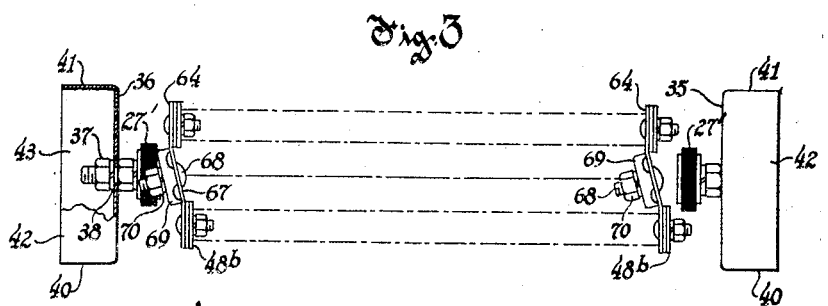
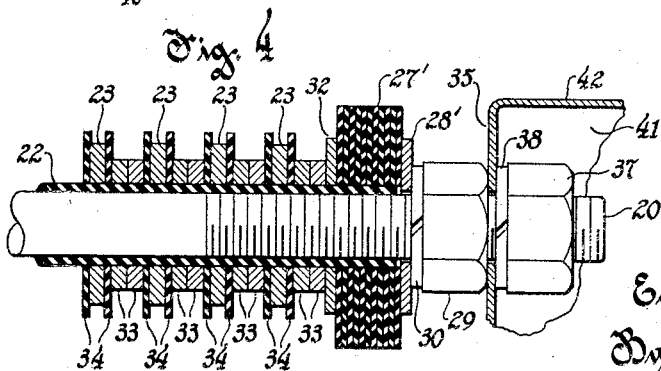
Inventor
Edwin N. Lightfoot
By Franklin M. Hubbard
Attorney 1,587,445